United States Patent
Suzuki (10) Patent No.: US 10,047,838 B2
(45) Date of Patent: Aug. 14, 2018

(54) SPEED CHANGER

(71) Applicant: JTEKT CORPORATION, Osaka-shi, Osaka (JP)

(72) Inventor: Akiyuki Suzuki, Nagoya (JP)

(73) Assignee: JTEKT CORPORATION, Osaka-shi (JP)

( * ) Notice: Subject to any disclaimer, the term of this patent is extended or adjusted under 35 U.S.C. 154(b) by 113 days.

(21) Appl. No.: 15/363,428

(22) Filed: Nov. 29, 2016

(65) Prior Publication Data
US 2017/0167581 A1    Jun. 15, 2017

(30) Foreign Application Priority Data

Dec. 10, 2015   (JP) .................................. 2015-241128

(51) Int. Cl.
*F16H 13/04*      (2006.01)
*F16H 13/08*      (2006.01)

(52) U.S. Cl.
CPC ............. *F16H 13/08* (2013.01); *F16H 13/04* (2013.01)

(58) Field of Classification Search
None
See application file for complete search history.

(56) References Cited

U.S. PATENT DOCUMENTS

| 4,909,098 | A | | 3/1990 | Kiryu | |
|---|---|---|---|---|---|
| 5,852,947 | A | * | 12/1998 | Tsujimoto | F16C 19/386 74/339 |
| 6,824,489 | B2 | * | 11/2004 | Jacob | F16C 19/182 384/504 |
| 9,145,919 | B2 | * | 9/2015 | Lee | F16C 33/58 |
| 2009/0189437 | A1 | * | 7/2009 | Takimoto | F16C 33/64 301/110.5 |

FOREIGN PATENT DOCUMENTS

JP         S60-143244 A      7/1985

* cited by examiner

*Primary Examiner* — Justin Holmes
(74) *Attorney, Agent, or Firm* — Oliff PLC (57) ABSTRACT

A speed changer includes an inner ring, an outer ring, a plurality of first tapered rollers provided in an annular space between inner ring and outer ring on one side in an axial direction, annular first cage that holds the first tapered rollers, a plurality of second tapered rollers provided in the annular space on the other side in the axial direction, and an annular second cage that holds the second tapered rollers. The first cage is a fixed member that is not allowed to rotate around a center line of the annular space. The outer ring is an input member to which a rotation torque is input. The second cage is an output member that outputs rotation resulting from reduction in a speed of the input. A first rotating portion including the first tapered rollers is different in specifications from a second rotating portion including the second tapered rollers.

12 Claims, 4 Drawing Sheets

SPEED CHANGER

INCORPORATION BY REFERENCE

The disclosure of Japanese Patent Application No. 2015-241128 filed on Dec. 10, 2015 including the specification, drawings and abstract, is incorporated herein by reference in its entirety.

BACKGROUND OF THE INVENTION

1. Field of the Invention

The invention relates to a speed changer.

2. Description of the Related Art

For example, for personal mobility and electric vehicles, a speed changer (gear unit) with a relatively high speed reducing ratio is used to output a high rotation torque using a small motor. As a speed changer that enables a high speed reducing ratio to be set, for example, a small-tooth-number-difference reduction gear and a strain wave gearing disclosed in Japanese Patent Application Publication No. S60-143244 (JP S60-143244 A) are known.

Conventional speed changers enable a speed change ratio (a speed reducing ratio and a speed increasing ratio) to be set to a desired value, but disadvantageously, the range of values that can be set (the range of selections) is narrow. Further disadvantageously, a significant change in speed change ratio needs a substantial change in design.

SUMMARY OF THE INVENTION

An object of the invention is to provide a speed changer that enables a speed change ratio to be variously set and easily varied.

A speed changer in an aspect of the invention includes an inner ring, an outer ring, a plurality of first rolling elements provided in an annular space between the inner ring and the outer ring on one side in an axial direction, an annular first cage that holds the first rolling elements, a plurality of second rolling elements provided in the annular space on the other side in the axial direction, and an annular second cage that holds the second rolling elements. The first cage is a fixed member that is not allowed to rotate around a center line of the annular space. The inner ring or the outer ring is an input member to which a rotation torque is input. The second cage is an output member that outputs rotation resulting from a reduction in a speed of the input. A first rotating portion including the first rolling elements and raceways of the inner ring and the outer ring on which the first rolling elements roll is different in specifications from a second rotating portion including the second rolling elements and raceways of the inner ring and the outer ring on which the second rolling elements roll.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
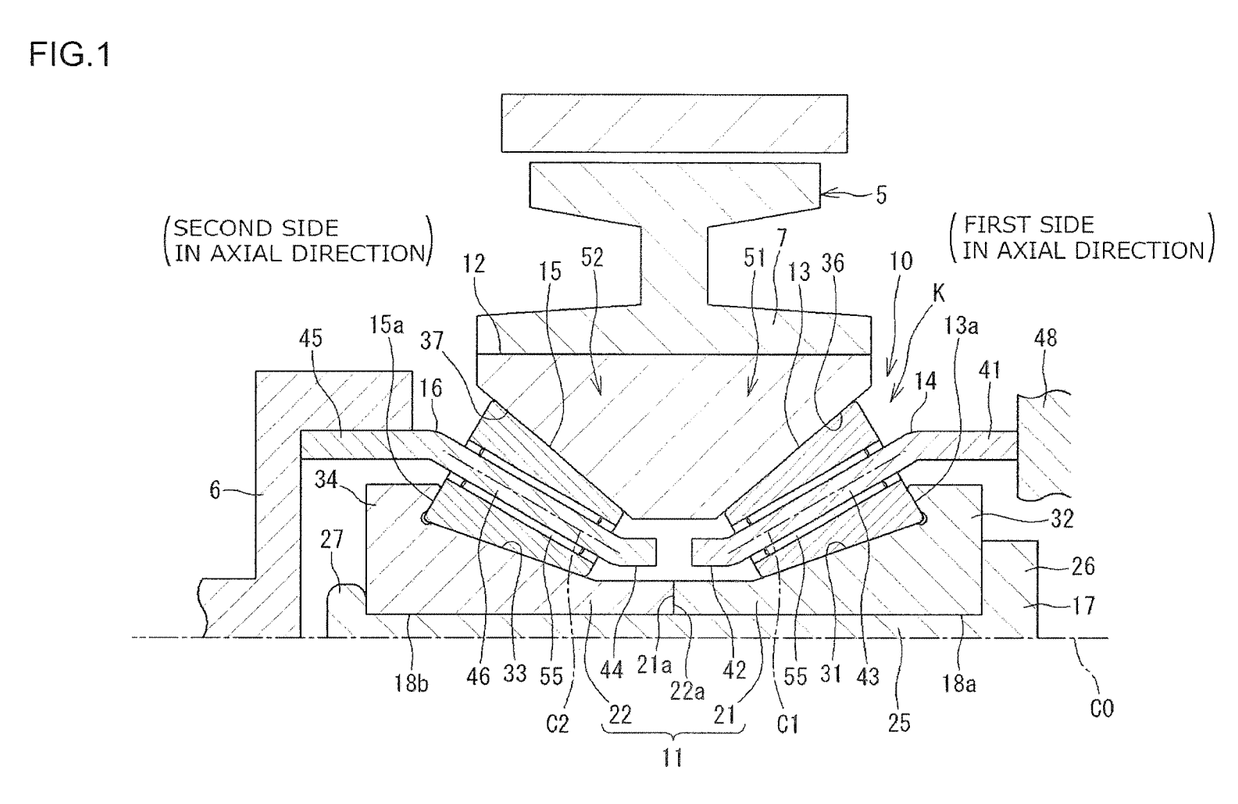
FIG. 1 is a sectional view depicting a first embodiment of a speed changer.

Embodiments of the invention will be described below. FIG. 1 is a sectional view of an embodiment of a speed changer. A speed changer 10 is an apparatus that changes the speed of rotation transmitted from a motor 5 and that outputs the resultant rotation to an output rotating member 6. The speed changer 10 includes an inner ring 11, an outer ring 12, a plurality of first tapered rollers (first rolling elements) 13, an annular first cage 14, a plurality of second tapered rollers (second rolling elements) 15, and an annular second cage 16. The first cage 14 holds the first tapered rollers 13. The second cage 16 holds the second tapered rollers 15.

The inner ring 11 includes a first division ring 21 and a second division ring 22 into which the inner ring 11 is axially divided. The division rings 21, 22 are cylindrical members in which axial through-holes 18a, 18b, respectively, are formed. A shaft member 17 passes through the through-holes 18a, 18b to integrally clamp the division rings 21, 22 together. The two division rings 21, 22, into which the inner ring 11 is divided, rotate synchronously. The shaft member 17 will be described below.

A first inner raceway 31 on which the first tapered rollers 13 roll is formed on an outer periphery of the first division ring 21. A cone back face rib (hereinafter referred to as a large rib) 32 is provided on a first side of the first inner raceway 31 in the axial direction. The first inner raceway 31 has a tapered shape. The large rib 32 is an annular portion that protrudes outward from the first inner raceway 31 in a radial direction. A roller large end face 13a of each of the first tapered rollers 13 contacts the large rib 32. A second inner raceway 33 on which the second tapered rollers 15 roll is formed on an outer periphery of the second division ring 22. A large rib 34 is provided on a second side of the second inner raceway 33 in the axial direction. The second inner raceway 33 has a tapered shape. The large rib 34 is an annular portion that protrudes outward from the second inner raceway 33 in the radial direction. A roller large end face 15a of each of the second tapered rollers 15 contacts the large rib 34.

The outer ring 12 is a single cylindrical member. To the outer ring 12, an input rotating member 7 is attached, which rotates integrally with a rotor of the motor 5. A first outer raceway 36 facing the first inner raceway 31 is formed on the first side of an inner periphery of the outer ring 12 in the axial direction. The first outer raceway 36 is a surface on which the first tapered rollers 13 roll, and has a tapered shape. A second outer raceway 37 facing the second inner raceway 33 is formed on the second side of the inner periphery of the outer ring 12 in the axial direction. The second outer raceway 37 is a surface on which the second tapered rollers 15 roll, and has a tapered shape.

The inner ring 11 and the outer ring 12 are concentrically provided, and an annular space K is formed between the inner ring 11 and the outer ring 12. A center line of the inner ring 11 and a center line of the outer ring 12 coincide with a center line C0 of the annular space K. The center line C0 corresponds to a center line of the speed changer 10. The first tapered rollers 13 are arranged along a circumferential direction on the first side of the annular space K in the axial direction. The second tapered rollers 15 are arranged along the circumferential direction on the second side of the annular space K in the axial direction.

The first cage 14 has a pair of annular portions 41, 42 and shaft portions 43. The annular portions 41, 42 are provided on the opposite sides of the first tapered rollers 13 in the axial direction. The shaft portions 43 couple the annular portions 41, 42 together. Each of the shaft portions 43 passes through the corresponding first tapered roller 13, which is thus held by the cage 14 so as to be rotatable. The second cage 16 has a pair of annular portions 44, 45 and shaft portions 46. The annular portions 44, 45 are provided on the opposite sides of the second tapered rollers 15 in the axial direction. The shaft portions 46 couple the annular portions 44, 45 together. Each of the shaft portions 46 passes through the corresponding second tapered roller 15, which is thus held by the cage 16 so as to be rotatable.

The first cage 14 is fixed, at the annular portion 41, to a part 48 of a housing of the speed changer 10. Thus, the first cage 14 is a fixed member that is not allowed to rotate around the center line C1. A member that fixes the first cage 14 may be other than the part 48 of the housing or a part of a structure installed along with the speed changer 10. Consequently, the motor 5 rotates the outer ring 12 to allow each of the first tapered rollers 13 to rotate around the center line C1 thereof. However, each first tapered roller 13 is prevented from revolving because the first tapered roller 13 is held by the first cage 14, which is a fixed member. The first cage 14 functions as a power (torque) transmission member that makes the revolution to rotationally drive the inner ring 11.

In contrast, the second cage 16 can revolve around the center line C2 in conjunction with rotation of the inner ring 11 and the outer ring 12. The second cage 16 communicates with the output rotating member 6 on the annular portion 45 side. As described below, the second cage 16 serves as an output member of the speed changer 10 to output rotation resulting from a reduction in the speed of an input from the motor 5. The second cage 16 functions as a power (torque) transmission member.

A first rotating portion 51 includes the first division ring 21, the first tapered rollers 13, and a part of the outer ring 12 on the first side in the axial direction. A second rotating portion 52 includes the second division ring 22, the second tapered rollers 15, and a part of the outer ring 12 on the second side in the axial direction. As described below, the first rotating portion 51 is different in specifications from the second rotating portion 52. The specifications include at least one of the diameters, the taper angles, and the like of the tapered rollers 13, 15, the taper angles, the diameters, and the like of the outer raceways 36, 37, and the taper angles, the diameters, and the like of the inner raceways 31, 33. A specific example will be described below.

The shaft member 17 has a shaft main body 25 that is elongate in the axial direction, a first bulging portion 26, and a second bulging portion 27. The first bulging portion 26 is formed on the first side of the shaft main body 25 in the axial direction and has a larger diameter than the through-hole 18a. The second bulging portion 27 is formed on the second side of the shaft main body 25 in the axial direction and has a larger diameter than the through-hole 18b. In the present embodiment, the second bulging portion 27 is formed by clinching (plastic working) an end of the shaft main body 25 integrated with the first bulging portion 26 and passing through the through-holes 18a, 18b. During the clinching, an axial preload is imposed on the first rotating portion 51 and the second rotating portion 52. The shaft member 17 keeps the preload imposed on the first rotating portion 51 and the second rotating portion 52. A surface 21a of the first division ring 21 on the second side in the axial direction faces a surface 22a of the second division ring 22 on the first side in the axial direction. As described above, the speed changer 10 is configured like a back-to-back double-row tapered roller bearing.

Figure 2:
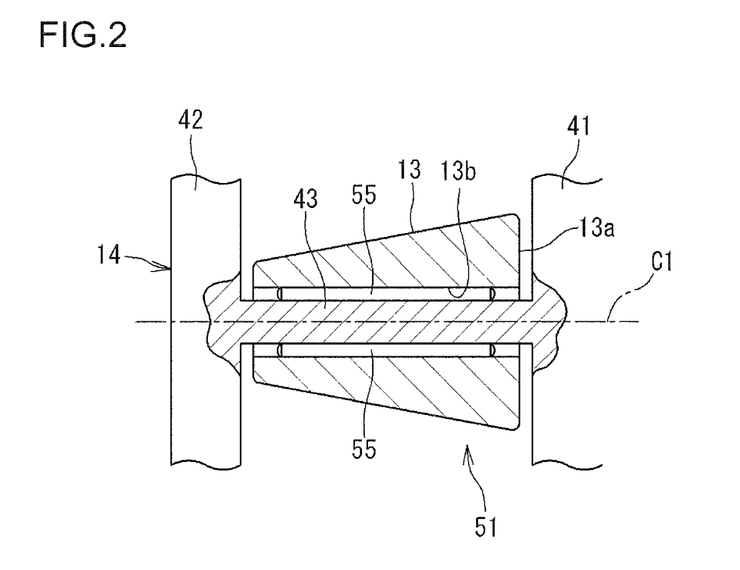
FIG. 2 is a diagram of a cage and a tapered roller as viewed from outside in a radial direction.

The cage 14 (16) and the tapered rollers 13 (15) in the first rotating portion 51 (second rotating portion 52) will be described. FIG. 2 is a diagram of the cage 14 and the tapered roller 13 in the first rotating portion 51 on the first side in the axial direction as viewed from outside in the radial direction. As described above, the cage 14 has the annular portions 41, 42 and the shaft portions 43 each coupling the annular portions 41, 42 together. A through-hole 13b centered around the roller center line C1 is formed in the tapered roller 13. The shaft portion 43 passes through the through-hole 13b. Both the through-hole 13b and the shaft portion 43 have a circular section, and a clearance is formed between the through-hole 13b and the shaft portion 43. A plurality of needle rollers 55 is provided in the clearance. Rotation of the tapered roller 13 allows the needle rollers 55 to rotate (roll) around the shaft portion 43. A peripheral configuration of the cage 16 and the tapered roller 15 in the second rotating portion 52 on the second side in the axial direction is similar to the configuration of the cage 14 and the tapered roller 13 in the first rotating portion 51, and will not be described below.

As described above, in the speed changer 10 depicted in FIG. 1, the first rotating portion 51 on the first side in the axial direction includes the first tapered rollers 13 and the raceways 31, 36 of the inner ring 11 and the outer ring 12 on which the first tapered rollers 13 roll. The second rotating portion 52 on the second side in the axial direction includes the second tapered rollers 15 and the raceways 33, 37 of the inner ring 11 and the outer ring 12 on which the second tapered rollers 15 roll. The first cage 14 is a fixed member fixed to the part 48 of the housing and is not allowed to revolve around the center line C0. Thus, each of the first tapered rollers 13 is rotatable around the center line C1 but is not allowed to revolve around the center line C0. The outer ring 12 serves as an input member to which the motor 5 inputs a rotation torque exerted around the center line C0. The second cage 16 serves as an output member that outputs rotation resulting from a reduction in the speed of the input. The inner ring 11 is configured to be rotatable. The first rotating portion 51 is different in specifications from the second rotating portion 52. In the present embodiment, the first outer raceway 36 is different in taper angle from the second outer raceway 37. The first tapered roller 13 has the same specifications as those of the second tapered roller 15. Thus, the first inner raceway 31 is also different in taper angle from the second inner raceway 33.

Operations of the speed changer 10 configured as described above will be described below. Rotation of the motor 5 allows the input rotating member 7 to rotate, thus rotating the outer ring 12 around the center line C0. Then, each first tapered roller 13 rotates around the center line C1 due to a friction force exerted between the first tapered roller 13 and the outer ring 12. The first tapered roller 13 does not revolve around the center line C0 along with the first cage 14, which is a fixed member. Rotation of each first tapered roller 13 around the center line C1 allows the first division ring 21 to rotate around the center line C0 due to a friction force exerted between each first tapered roller 13 and the first division ring 21 (inner ring 11). The first division ring 21 and the second division ring 22 are coupled together so as to be integrally rotatable. Consequently, the second division ring 22 rotates synchronously with the first division ring 21, allowing rotation of the inner ring 11 as a whole.

Rotation of the inner ring 11 allows the second tapered rollers 15 to revolve around the center line C0 due to a friction force exerted between the inner ring 11 and each second tapered roller 15 and to roll on the second inner raceway 33. At this time, the second tapered rollers 15 revolve around the center line C0 while each rotating around the center line C2. As described above, the first rotating portion 51 is different in specifications from the second rotating portion 52. Consequently, the second tapered rollers 15 rotate with a period different from that of the first tapered rollers 13, while revolving around the center line C0 along the second inner raceway 33 and the second outer raceway 37. Revolution of the second tapered rollers 15 around the center line C0 allows the second cage 16 to revolve around the center line C0 at the same revolution speed as that of the second tapered rollers 15. The output rotating member 6 is attached to the second cage 16 and can thus be rotated. The rotation speed of the output rotating member 6 (second cage 16) is lower than the rotation speed of the input rotating member 7 (outer ring 12).

In the speed changer 10 depicted in FIG. 1, the first rotating portion 51 is different in specifications from the second rotating portion 52. Consequently, the outer ring 12, serving as an input member, is rotated around the center line C0 to allow the second tapered rollers 15 to make planetary motion. Then, the speed of the rotation input from the outer ring 12 is reduced, and the rotation with the speed thereof reduced can be output to the second cage 16. When the first rotating portion 51 and the second rotating portion 52 are set to have predetermined different specifications, the rotation speed of the second cage 16 is varied to enable a speed reducing ratio to be variously set. Furthermore, the speed reducing ratio can be varied by slightly varying the specifications without the need to change the outside diameter of the outer ring 12, in other words, without the need to change the size of the speed changer 10. Thus, the speed reducing ratio can be easily varied. If the specifications of the first rotating portion 51 are all the same as the specifications of the second rotating portion 52, the second cage 16 does not rotate, like the first cage 14, and thus output no rotation.

A specific example will be described. For example, the speed reducing ratio can be set based on one or both of the taper angles of the outer raceways 36, 37 of the outer ring 12 and one or both of the taper angles of the tapered rollers 13, 15. When the outer raceway 36 of the first rotating portion 51 has a taper angle of 14°, each first tapered roller 13 has a taper angle of 6°, the outer raceway 37 of the second rotating portion 52 has a taper angle of 14.5°, and each second tapered roller 15 has a taper angle of 6°, a speed reducing ratio of "103" can be achieved. When the taper angle of the outer raceway 37 of the second rotating portion 52 is changed to 18° with the specifications (14°, 6°) of the first rotating portion 51 unchanged (the second tapered roller 15 has a taper angle of 6°), a speed reducing ratio of "17" can be achieved. As described above, the configuration in the present embodiment enables the speed reducing ratio to be significantly varied by slightly varying the specifications.

A transmission torque in the speed changer 10 depicted in FIG. 1 is determined by Equation (1).

$$\text{Transmission torque: } T = \mu \times F \times D \quad (1)$$

In the equation, a coefficient of traction is denoted by $\mu$, and the average diameter of the inner ring raceways (31, 33) is denoted by D. A load imposed on the raceways (31, 33) is denoted by F, and $F = Fa/\sin \beta$ is satisfied. An inner ring contact angle is denoted by $\beta$. An axial preload is denoted by Fa. In the speed changer 10 in the present embodiment, when $\mu=0.2$, $D=0.1$ [m], $Fa=4$ [kN], and $\beta=15$ [°], the transmission torque is 154.5 [Nm], which is a sufficient value.

In the speed changer 10 depicted in FIG. 1, the rolling elements in the first rotating portion 51 and the second rotating portion 52 are the tapered rollers (13, 15), respectively. The inner ring 11 includes the first division ring 21 and the second division ring 22 into which the inner ring 11 is axially divided. The first division ring 21 and the second division ring 22 are clamped together with an axial preload imposed on the first division ring 21 and the second division ring 22 via the shaft member (clamping member) 17. As described above, a rigid configuration can be provided in the speed changer 10 by using the tapered rollers (13, 15) as the rolling elements and imposing an axial preload on the first division ring 21 and the second division ring 22.

Moreover, the structure that achieves the clamping with a preload imposed as described above is the shaft member 17 provided across the first division ring 21 and the second division ring 22. This simplifies the configuration that integrates the first division ring 21 with the second division ring 22 with an axial preload imposed on the first division ring 21 and the second division ring 22. Such a clamping member (shaft member 17) allows for a reduction in the size of the configuration that imposes a preload, enabling the speed changer 10 as a whole to be miniaturized.

As described above for operations of the speed changer 10, to transmit the rotation torque to the output member (second cage 16), the tapered rollers 13, 15 held by the first and second cages 14 and 16 rotate, and at this time, come into contact with parts (shaft portions 43, 46) of the cages 14, 16. Thus, in the present embodiment, the through-hole 13b centered around the roller center line C1 is formed in each tapered roller 13 (15) as depicted in FIG. 2. The cage 14 (16) has the shaft portions 43 each passing through the through-hole 13b. The needle rollers 55 are interposed between each through-hole 13b and the corresponding shaft portion 43. In this configuration, each tapered roller 13 (15) held by the cage 14 (16) is supported by the corresponding shaft portion 43 of the cage 14 (16) via the needle rollers 55. Thus, the tapered rollers 13 (15) rotate smoothly to enable a reduction in rotational loss.

Figure 3:
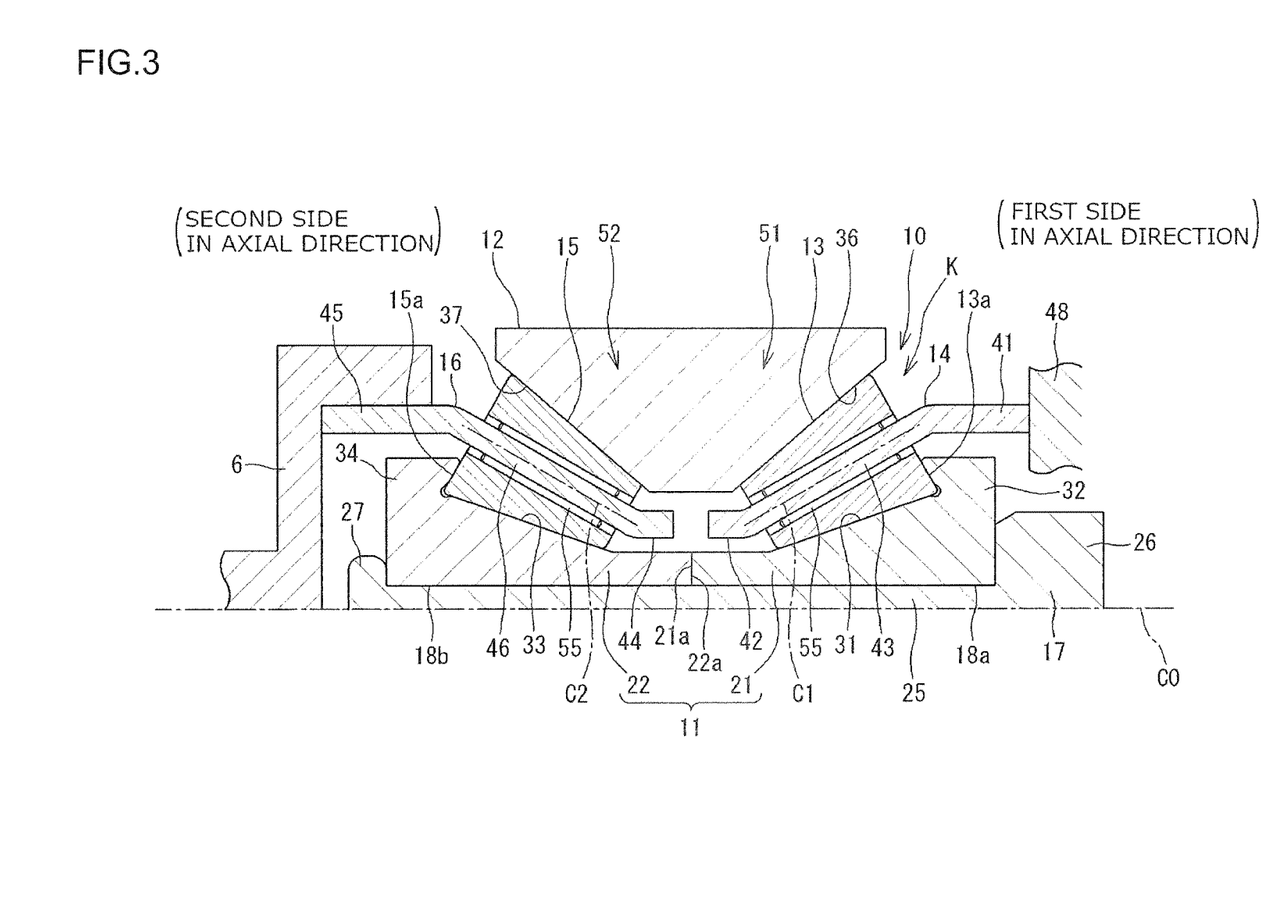
FIG. 3 is a sectional view of the speed changer in a second embodiment.

FIG. 3 is a sectional view of the speed changer 10 in a second embodiment. The same components in FIG. 1 and FIG. 3 are denoted by the same reference numerals wherever possible, and duplicate descriptions are omitted. In FIG. 3, the inner ring 11 serves as an input member to which the rotation torque exerted around the center line C0 is input. Specifically, the shaft member 17 that integrates the first division ring 21 with the second division ring 22 is coupled to an output shaft of the motor. The outer ring 12 is a single cylindrical member configured to be rotatable.

More specifically, the first cage 14 is a fixed member that is not allowed to rotate around the center line C0. This configuration is the same as the corresponding configuration in the embodiment depicted in FIG. 1. In the speed changer 10 depicted in FIG. 3, the inner ring 11 serves as an input member to which the rotation torque is input. The second cage 16 serves as an output member that outputs rotation resulting from a reduction in the speed of the input. The first rotating portion 51 is different in specifications from the second rotating portion 52.

In the embodiment depicted in FIG. 3, the inner ring 11 also includes the first division ring 21 and the second division ring 22. The first division ring 21 and the second division ring 22 are clamped together with an axial preload imposed on the first division ring 21 and the second division ring 22 using the shaft member (clamping member) 17. In each of the embodiments depicted in FIG. 3 and FIG. 1, the clinched portion (27) may be omitted from the shaft member 17, and instead, bolts and nuts may be used for the shaft member 17. In other words, the first division ring 21 and the second division ring 22 can be clamped together with a preload imposed on the first division ring 21 and the second division ring 22 by fastening bolts and nuts.

In the embodiment depicted in FIG. 3, each tapered roller 13 (15) is also supported by the corresponding shaft portion 43 (46) of the cage 14 (16) via the needle rollers 55 as is the case with the configuration described with reference to FIG. 2.

Compared to the embodiment depicted in FIG. 1, the embodiment depicted in FIG. 3 eliminates the need to provide the input rotating member 7 (see FIG. 1) outside the outer ring 12 in the radial direction, enabling a reduction in the outside diameter (height dimension) of the speed changer 10.

In the description of the embodiment depicted in FIG. 3, the speed changer 10 functions as a reduction gear including the inner ring 11 as an input member and the second cage 16 as an output member. The speed changer 10 depicted in FIG. 3 may be used as a speed up gear without the need for a change in configuration. In other words, the second cage 16 may be used as an input member and the inner ring 11 may be used as an output member.

In the speed changer 10 used as a speed up gear, in FIG. 3, the first cage 14 is a fixed member that is not allowed to rotate around the center line C0. The second cage 16 serves as an input member to which the rotation torque exerted around the center line C0 is input by a motor or the like. In the embodiment depicted in FIG. 3, the inner ring 11 serves as an output member that outputs rotation resulting from an increase in the speed of the input. The first rotating portion 51 is different in specifications from the second rotating portion 52.

The speed changer 10 depicted in FIG. 1 may also be used as a speed up gear including the second cage 16 as an input member and the outer ring 12 as an output member. In the embodiment depicted in FIG. 1, the outer ring 12 serves as an output member that outputs rotation with the speed thereof increased.

Thus, in the speed changer 10 described in the second embodiment, the first rotating portion 51 is different in specifications from the second rotating portion 52. Consequently, rotation of the second cage 16, serving as an input member, around the center line C0 allows the second tapered rollers 15 to make planetary motion. The speed of rotation input from the second cage 16 can be increased, and the resultant rotation can be output to the output member (inner ring 11 or outer ring 12). Moreover, the first rotating portion 51 and the second rotating portion 52 have predetermined different specifications. This allows the rotation speed of the second cage 16 to be varied to enable a speed increasing ratio to be variously set. Furthermore, the speed increasing ratio can be varied by slightly varying the specifications without the need to change the outside diameter of the outer ring 12 (in other words, without the need to change the size of the speed changer 10). Thus, the speed increasing ratio can be easily varied.

Figure 4:
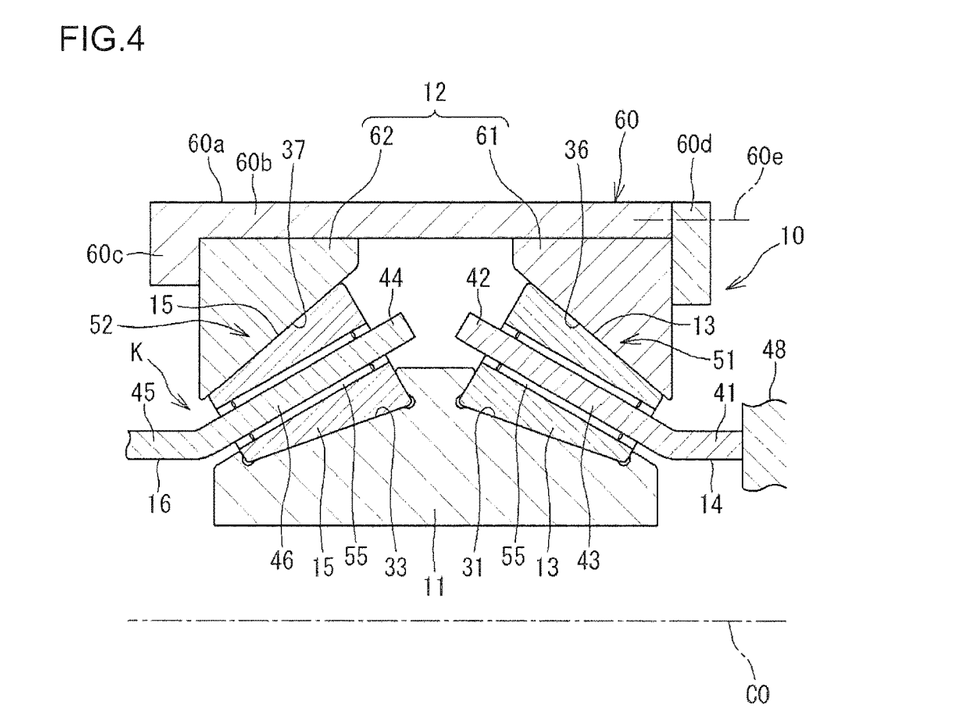
FIG. 4 is a sectional view of the speed changer in a third embodiment.

FIG. 4 is a sectional view of the speed changer 10 in a third embodiment. In the above-described embodiments, the inner ring 11 is divided into the first division ring 21 and the second division ring 22. However, in the embodiment depicted in FIG. 4, the outer ring 12 is axially divided. In other words, the outer ring 12 includes a first division ring 61 and a second division ring 62 into which the outer ring 12 is axially divided. The first division ring 61 has the first outer raceway 36 on the inner periphery thereof, and the second division ring 62 has the second outer raceway 37 on the inner periphery thereof.

A tube member 60 is provided outside the first division ring 61 and the second division ring 62 in the radial direction. The tube member 60 is provided across the first division ring 61 and the second division ring 62 to serve as a clamping member that integrates the first division ring 61 with the second division ring 62. Specifically, the tube member 60 has a tube main body portion 60a and a circular-ring portion 60d. The tube main body portion 60a has a cylindrical first portion 60b and a circular-ring-like second portion 60c. The first portion 60b is externally fitted over the first division ring 61 and the second division ring 62. The second portion 60c is integrated with the first portion 60b and located on the second side of the second division ring 62 in the axial direction so as to be in contact with the second division ring 62. A circular-ring portion 60d is shaped like a circular ring and located on the first side of the first division ring 61 in the axial direction so as to be in contact with the first division ring 61. The tube main body portion 60a and the circular-ring portion 60d can be coupled together, for example, via a bolt 60e and can be separated from each other by removing the bolt 60e. Thus, the tube member 60 having the tube main body portion 60a and the circular-ring portion 60d, and the bolt 60e are used as clamping members. The bolt 60e is tightened. Consequently, the clamping members allow the first division ring 61 and the second division ring 62 to be clamped together with an axial preload imposed on the first division ring 61 and the second division ring 62. Thus, a rigid configuration is provided for the outer ring 12. The outer ring 12 is divided into the two division rings 61, 62, which rotate synchronously.

The speed changer 10 depicted in FIG. 4 can function as a reduction gear as is the case with the embodiment depicted in FIG. 1. For components of the reduction gear, the speed changer 10 depicted in FIG. 4 includes the inner ring 11, the outer ring 12, the first tapered rollers 13, the annular first cage 14, the second tapered rollers 15, and the annular second cage 16. The first tapered rollers 13 are provided on the first side of the annular space K between the inner ring 11 and the outer ring 12 in the axial direction. The first cage 14 holds the first tapered rollers 13. The second tapered rollers 15 are provided on the second side of the annular space K in the axial direction. The second cage 16 holds the second tapered rollers 15. The first cage 14 is fixed to the part 48 of the housing and serves as a fixed member that is not allowed to revolve around the center line C0 of the annular space K. The outer ring 12 (or the inner ring 11) serves as an input member to which the rotation torque exerted around the center line C0 is input. The second cage 16 serves as an output member that outputs rotation resulting from a reduction in the speed of the input. When the outer ring 12 serves as an input member, the inner ring 11 is rotatable. When the inner ring 11 serves as an input member, the outer ring 12 is rotatable.

The first rotating portion 51 is different in specifications from the second rotating portion 52. In the present embodiment, the first outer raceway 36 is different in taper angle from the second outer raceway 37. Operations of the speed changer 10 configured as described above are similar to the operations of the speed changer 10 described with reference to FIG. 1 and will not be described below.

In the above description, the speed changer 10 depicted in FIG. 4 functions as a reduction gear including the outer ring 12 (or the inner ring 11) as an input member and the second cage 16 as an output member. The speed changer 10 depicted in FIG. 4 may be used as a speed up gear without the need for a change in configuration. In other words, the second cage 16 may be used as an input member, and the outer ring 12 (or the inner ring 11) may be used as an output member.

In FIG. 1 and FIG. 3, the speed changer 10 is configured like a back-to-back double-row tapered roller bearing. However, the invention is not limited to this. Although not depicted in the drawings, the speed changer 10 as in FIGS. 1 and 3 may be configured like a front-to-front double-row tapered roller bearing. The speed changer 10 depicted in FIG. 4 is configured like a front-to-front double-row tapered roller bearing. However, the invention is not limited to this. Although not depicted in the drawings, the speed changer 10 as in FIG. 4 may be configured like a back-to-back double-row tapered roller bearing.

In the speed changer 10 in each of the above-described embodiments, the first rotating portion 51 is different in specifications from the second rotating portion 52. The specifications include the inclination angles of the raceways (outer raceways 36, 37, inner raceways 31, 33) and the taper angles of the tapered rollers 13, 15. Varying at least one of the specifications enables the desired speed change ratio to be achieved.

In the speed changer 10 in each of the above-described embodiments, the inner ring 11, the outer ring 12, the tapered rollers 13, 15, and the cages 14, 16 are formed of bearing steel, carbon steel, or the like. In the above-described embodiments, the cages 14, 16 are in the form depicted in FIG. 2. However, the shape of the cages 14, 16 may be other than the shape depicted in FIG. 2. For example, the cage may include, instead of the shaft portions 43, cage bars each provided between the adjacent tapered rollers 13, 13 (rather than passing through the tapered roller 13). In this case, a space formed between the annular portions 41, 42 and between the adjacent cage bars corresponds to a pocket in which each tapered roller 13 is held. In this case, the cage 14 and each tapered roller 13 are in sliding contact with each other. The cage 14 has the shaft portions 43 (see FIG. 2). However, the needle rollers 55 may be omitted.

As described above, the speed changer 10 in each of the above-described embodiments is based on the technical concept that the revolution speed may be varied between the inner ring 11 and the outer ring 12 and each tapered roller 15 according to differences in internal specifications between the first rotating portion 51 and the second rotating portion 52. This enables a high speed change ratio to be achieved. In the speed changer 10 in each of the above-described embodiments, substantially no sliding portion is present in the power transmission path. Thus, the speed changer 10 is an apparatus that is excellent in power transmission efficiency.

The embodiments disclosed above are illustrative in every way and are not restrictive. In other words, the speed changer in the invention is not limited to the illustrated embodiments but may be in other embodiments within the scope of the invention. For example, in the description, the rolling elements between the inner ring 11 and the outer ring 12 are tapered rollers. However, the rolling elements may be cylindrical rollers.

The speed changer in the invention enables the speed change ratio to be variously set and to be easily varied.

What is claimed is:

1. A speed changer comprising:
an inner ring;
an outer ring;
a plurality of first rolling elements provided in an annular space between the inner ring and the outer ring on one side in an axial direction;
an annular first cage that holds the first rolling elements;
a plurality of second rolling elements provided in the annular space on the other side in the axial direction; and
an annular second cage that holds the second rolling elements, wherein
the first cage is a fixed member that is not allowed to rotate around a center line of the annular space,
the inner ring or the outer ring is an input member to which a rotation torque is input,
the second cage is an output member that outputs rotation resulting from a reduction in a speed of the input, and
a first rotating portion including the first rolling elements and raceways of the inner ring and the outer ring on which the first rolling elements roll is different in specifications from a second rotating portion including the second rolling elements and raceways of the inner ring and the outer ring on which the second rolling elements roll.

2. A speed changer comprising:
an inner ring;
an outer ring;
a plurality of first rolling elements provided in an annular space between the inner ring and the outer ring on one side in an axial direction;
an annular first cage that holds the first rolling elements;
a plurality of second rolling elements provided in the annular space on the other side in the axial direction; and
an annular second cage that holds the second rolling elements, wherein
the first cage is a fixed member that is not allowed to rotate around a center line of the annular space, and the second cage is an input member to which a rotation torque is input,
the inner ring or the outer ring is an output member that outputs rotation resulting from an increase in a speed of the input, and
a first rotating portion including the first rolling elements and raceways of the inner ring and the outer ring on which the first rolling elements roll is different in specifications from a second rotating portion including the second rolling elements and raceways of the inner ring and the outer ring on which the second rolling elements roll.

3. The speed changer according to claim 1, wherein the first rolling elements and the second rolling elements are tapered rollers,
the inner ring or the outer ring is axially divided into a first division ring and a second division ring each having the raceway, and
the first division ring and the second division ring are clamped together with an axial preload imposed on the first division ring and the second division ring using a clamping member.

4. The speed changer according to claim 2, wherein the first rolling elements and the second rolling elements are tapered rollers,
the inner ring or the outer ring is axially divided into a first division ring and a second division ring each having the raceway, and the first division ring and the second division ring are clamped together with an axial preload imposed on the first division ring and the second division ring using a clamping member.

5. The speed changer according to claim 3, wherein the clamping member has a shaft member or a tube member which is provided across the first division ring and the second division ring.

6. The speed changer according to claim 4, wherein the clamping member has a shaft member or a tube member which is provided across the first division ring and the second division ring.

7. The speed changer according to claim 1, wherein the first rolling elements and the second rolling elements are tapered rollers,
   a through-hole centered around a roller center line is formed in each of the tapered rollers,
   each of the first cage and the second cage has a pair of annular portions provided on opposite sides of the tapered rollers and shaft portions coupling the annular portions together and each passing through the corresponding through-hole, and
   needle rollers are interposed between each of the through-holes and the corresponding shaft portion.

8. The speed changer according to claim 2, wherein the first rolling elements and the second rolling elements are tapered rollers,
   a through-hole centered around a roller center line is formed in each of the tapered rollers,
   each of the first cage and the second cage has a pair of annular portions provided on opposite sides of the tapered rollers and shaft portions coupling the annular portions together and each passing through the corresponding through-hole, and
   needle rollers are interposed between each of the through-holes and the corresponding shaft portion.

9. The speed changer according to claim 3, wherein the first rolling elements and the second rolling elements are tapered rollers,
   a through-hole centered around a roller center line is formed in each of the tapered rollers,
   each of the first cage and the second cage has a pair of annular portions provided on opposite sides of the tapered rollers and shaft portions coupling the annular portions together and each passing through the corresponding through-hole, and
   needle rollers are interposed between each of the through-holes and the corresponding shaft portion.

10. The speed changer according to claim 4, wherein the first rolling elements and the second rolling elements are tapered rollers,
    a through-hole centered around a roller center line is formed in each of the tapered rollers,
    each of the first cage and the second cage has a pair of annular portions provided on opposite sides of the tapered rollers and shaft portions coupling the annular portions together and each passing through the corresponding through-hole, and
    needle rollers are interposed between each of the through-holes and the corresponding shaft portion.

11. The speed changer according to claim 5, wherein the first rolling elements and the second rolling elements are tapered rollers,
    a through-hole centered around a roller center line is formed in each of the tapered rollers,
    each of the first cage and the second cage has a pair of annular portions provided on opposite sides of the tapered rollers and shaft portions coupling the annular portions together and each passing through the corresponding through-hole, and
    needle rollers are interposed between each of the through-holes and the corresponding shaft portion.

12. The speed changer according to claim 6, wherein the first rolling elements and the second rolling elements are tapered rollers,
    a through-hole centered around a roller center line is formed in each of the tapered rollers,
    each of the first cage and the second cage has a pair of annular portions provided on opposite sides of the tapered rollers and shaft portions coupling the annular portions together and each passing through the corresponding through-hole, and
    needle rollers are interposed between each of the through-holes and the corresponding shaft portion.

* * * * *